W. GREEN.
Bee Hive.
No. 39,729.  Patented Sept. 1, 1863.
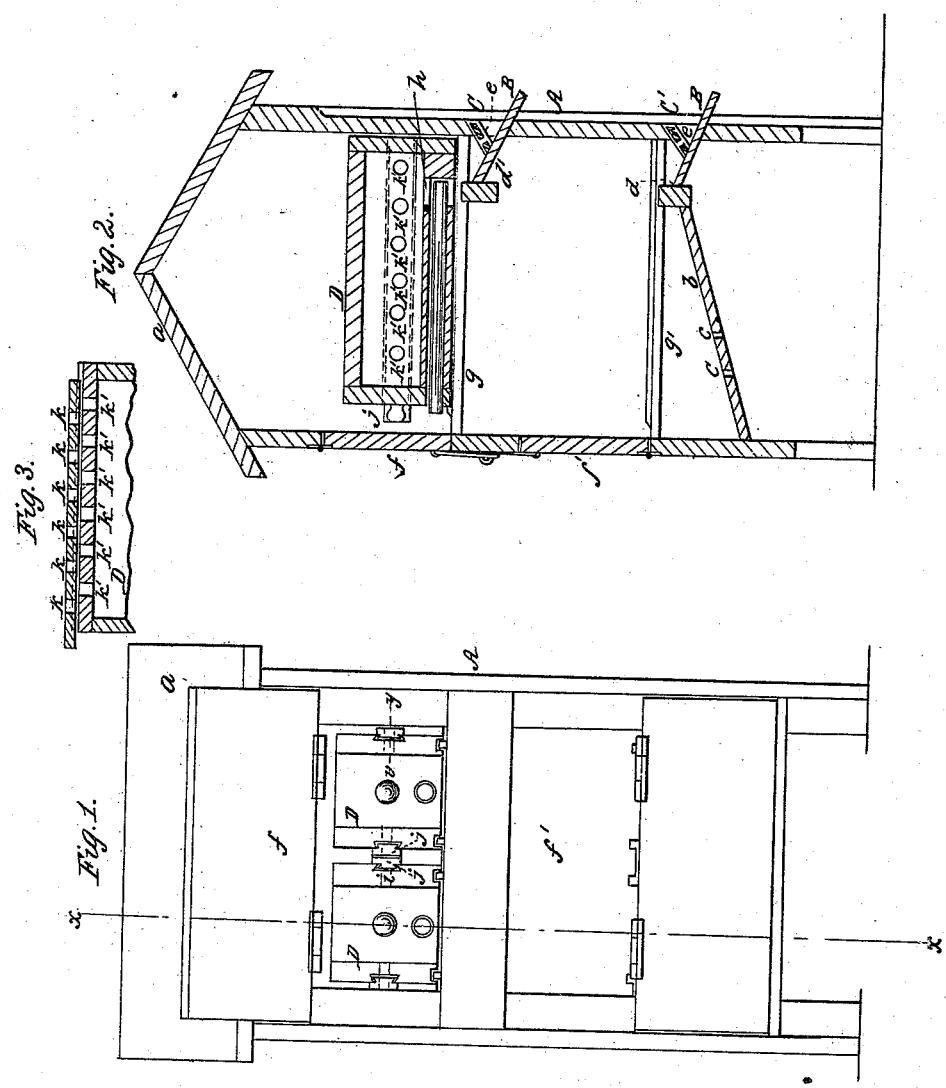

UNITED STATES PATENT OFFICE.

WELLINGTON GREEN, OF KINZUA, PENNSYLVANIA.

IMPROVEMENT IN BEE-HIVES.

Specification forming part of Letters Patent No. 39,729, dated September 1, 1863.

*To all whom it may concern:*

Be it known that I, WELLINGTON GREEN, of Kinzua, in the county of Warren and State of Pennsylvania, have invented a new and Improved Bee-Hive; and I do hereby declare that the following is a full, clear, and exact description of the same, reference being had to the accompanying drawings, making a part of this specification, in which—

Figure 1 is a back elevation of my invention, the doors of the hive being opened; Fig. 2, a vertical section of the same, taken in the line $x$ $x$, Fig. 1; Fig. 3, a horizontal section of a portion of one of the drawers of the same, taken in the line $y$ $y$, Fig. 1.

Similar letters of reference indicate corresponding parts in the several figures.

The object of this invention is to obtain a bee-hive which will admit of a thorough ventilation, and at the same time be proof against the invasion of the moth and admit of drawers being placed in the hive or structure and removed therefrom with the greatest facility, and also admit of a communication being formed or cut off between the drawers, as occasion may require.

To enable those skilled in the art to fully understand and construct my invention, I will proceed to describe it.

A represents a house or structure, which may be constructed of any suitable dimensions and provided with a pitch roof, $a$, and a bottom or flooring, $b$, the latter being some distance above the surface of the ground. The flooring $b$ is inclined and has perforations $c$ made in it, as shown clearly in Fig. 2.

B B' are two alighting-boards, one of which, B, is some distance above the other, B'. These alighting-boards are inclined and project a suitable distance out from the house A, and also extend upward within it, the lower one, B', abutting against a bar or beam, $d$, against which the upper or elevated end of the flooring $b$ abuts. The upper alighting-board, B, abuts against a bar or beam, $d'$. (See Fig. 2.)

C C' represent two slides, which are fitted in grooves in the sides of the house A and directly over the alighting-boards B B'. The slides C C' are both perforated, as shown at $e$, and may be raised or lowered, so as to afford bee-entrances into the house of greater or less capacity, as may be required, and to close the entrances entirely when desired. At the back of the house A there are two doors, $f f'$, which are connected by hinges to the house, and in such a manner that one door, $f$, may be raised or turned upward in opening, and the other, $f'$, turned downward. (See Fig. 1.) By this arrangement the two doors when closed may be secured in a closed state by one and the same fastening. The house A is provided with horizontal bars $g$ $g'$, placed within it at suitable distances apart, so as to form supports for drawers D, each drawer resting on two bars, and more or less drawers being used, according to the dimensions of the hive. The drawers D are placed side by side, and they are provided with apertures $h$ in their bottoms, so that they may communicate with drawers below them on the bars $g$. The lower drawers are not shown in the drawings. The drawers have longitudinal dovetail grooves $i$ made in their sides, into which bars or slides $j$ are fitted, the latter being beveled at the edges to correspond to the dovetail of the grooves $i$.

The slides $j$ are perforated with holes $k$, and similar perforations, $k'$, are made in the sides of the drawers D through the grooved portions thereof. By moving or adjusting the slides $j$ the perforations in the sides of the drawers may be made to register with those in the slides, or not, as desired, and a communication formed between the drawers or cut off, as desired. (See Fig. 3.) By this arrangement it will be seen that a drawer may be removed from and fitted in the house A with the greatest facility, and drawers may be added from time time, so as to afford space for the bees to work in, and thereby prevent swarming. During cold weather the slides C C' may be closed, so as to prevent the bees from leaving the house, air being admitted through the perforations in said slides and the perforations in the bottom $b$. The house A being close or tightly built, the moth is excluded from it, for there are no direct entrances into the drawers, and if a miller attempts to enter through the legitimate opening underneath the slides C C' it can be readily ejected by the bees, in consequence of the inclined alighting-boards B B'.

The whole arrangement is extremely simple and the house may be constructed of any desired size, so as to hold a greater or less number of drawers.

Having thus described my invention, what I claim as new, and desire to secure by Letters Patent, is—

A house or structure, A, provided with drawers D, fitted within it as shown, and provided with a perforated bottom, b, alighting-boards B B', and perforated slides C C', all arranged and combined to form a new and improved bee-house or bee-hive, substantially as set forth.

WELLINGTON GREEN.

Witnesses:
J. J. SHEARMAN,
JOHN LYLE.